United States Patent [19]
Richardson et al.

[11] Patent Number: 5,607,181
[45] Date of Patent: Mar. 4, 1997

[54] LIQUID-FUELED INFLATOR WITH A POROUS CONTAINMENT DEVICE

[75] Inventors: William B. Richardson, Kaysville; Karl K. Rink; Linda M. Rink, both of Liberty, all of Utah

[73] Assignee: Morton International, Inc., Chicago, Ill.

[21] Appl. No.: 565,333

[22] Filed: Nov. 30, 1995

[51] Int. Cl.[6] ................................................ B60R 21/26
[52] U.S. Cl. .......................... 280/737; 280/741; 222/3
[58] Field of Search .................................. 280/736, 737, 280/741, 740, 742; 222/3, 5; 137/68.13, 68.19, 68.23; 102/530, 531

[56] References Cited

U.S. PATENT DOCUMENTS

| | | | |
|---|---|---|---|
| 5,060,973 | 10/1991 | Giovanetti | 280/736 |
| 5,330,730 | 7/1994 | Brede et al. | 422/305 |
| 5,348,344 | 9/1994 | Blumenthal et al. | 280/737 |
| 5,470,104 | 11/1995 | Smith et al. | 280/737 |
| 5,487,561 | 1/1996 | Mandzy et al. | 280/736 |
| 5,494,312 | 2/1996 | Rink | 280/737 |
| 5,531,473 | 7/1996 | Rink et al. | 280/737 |

FOREIGN PATENT DOCUMENTS 0540013  5/1993  European Pat. Off. .

*Primary Examiner*—Brian L. Johnson
*Assistant Examiner*—Peter C. English
*Attorney, Agent, or Firm*—Henry W. Tarring, II; Gerald K. White

[57] ABSTRACT

A liquid fueled inflator for a vehicle passive restraint airbag system is enhanced by storing the liquid fuel or propellant in a porous solid structure. The structure provides enhanced control over the combustion process by its influence over disbursement of the fuel or propellant into the combustion chamber. Porous structures which meter the disbursement of fuel or propellant into the combustion chamber, and frangible porous structures which propel the fuel throughout the combustion chamber are described.

28 Claims, 2 Drawing Sheets

LIQUID-FUELED INFLATOR WITH A POROUS CONTAINMENT DEVICE

BACKGROUND OF THE INVENTION

Inflatable restraint systems, commonly referred to as airbag systems, which deploy automatically in the event of a collision to shield and cushion the occupants of a vehicle from the hard surfaces within the passenger compartment, have become very popular in modern motor vehicles. Many types of inflator devices for inflating the airbag cushion in such systems have been disclosed. Such inflators should be capable of releasing a sufficient quantity of a non-toxic gas to inflate the airbag cushion in a very short period of time. Additionally, the inflator needs to provide a high degree of reliability over the extended temperature range in which modern vehicles are expected to operate, and over the extended lifetime of the vehicle.

One of the disclosed inflator designs relies on a stored compressed gas which is released to inflate the airbag. Another design relies on the ignition of a solid gas generating material to produce a sufficient quantity of gas to inflate the airbag. A third type of inflator relies on the combination of an inert stored compressed gas and the combustion of a solid gas generating material. While these designs are functional to provide the gas needed to inflate an airbag, they each have disadvantages. The designs which rely solely on compressed gas must provide a strong gas storage container, the relatively thick walls of which increase the weight and bulk of the airbag assembly, a concern to those vehicle manufacturers who seek to minimize the weight of such vehicles. The designs which rely on the ignition of a gas generant material often result in a generated gas which contains solid particulate material at an elevated temperature, requiring that the gas be further conditioned, by filtration and cooling, before it encounters the fabric cushion of the airbag assembly.

Some of the more recent inflator designs rely on fluid fuels and oxidants which, in addition to lower manufacturing costs, offer advantages such as cleaner generated gases containing little or no solid particulate matter, and which can be provided at relatively low temperatures and with relatively low concentrations of products of incomplete combustion. Some of these designs are more fully described in U.S. patent application Ser. No. 08/252,036, entitled FLUID FUELED AIR BAG INFLATOR, filed on May 31, 1994 by Bradley W. Smith and Karl K. Rink, now U.S. Pat. No. 5,470,104 and commonly assigned with this application. Application Ser. No. 08/252,036 is hereby incorporated by reference herein.

A need exists, however, to improve the design of the known liquid fueled inflators to provide structural characteristics which provide regulation of the gas storage, heating and release procedure whereby the proper design of the structure enables the inflation characteristics of the airbag to be tailored to meet specific requirements. Some of the liquid fuels result in a high rate of gas delivery which could cause excessive stress on the airbag cushion and module. Such fuels further raise concern about possible injury to an out-of-position occupant. The capability of tailoring the gas delivery rate, through the selection of structural parameters of the components of the airbag system, provides flexibility in the selection of different fuels to be used in such systems. The designs must also provide for the flammable components to be held safely over the expected lifetime of the vehicle. Further, the designs need to reliably produce an inflation gas which does not contain significant amounts of relatively toxic incompletely combusted gases. Finally, the designs should be able to be manufactured and filled with the flammable mixtures quickly and safely.

SUMMARY OF THE INVENTION

One of the objects of the present invention is the provision of a liquid fueled inflator wherein improved mixing and ignition of the fuel and the oxidizer assures relatively complete combustion of the fuel, and thereby avoids the production of relatively toxic incompletely combusted gases.

Another object is the provision of a liquid fueled inflator having a unique storage chamber which provides for safe storage of the fuel.

A further object is the provision of a liquid fueled inflator having structural characteristics which can be altered to affect the inflation characteristics of the airbag, thereby providing an enhanced degree of control over the airbag performance.

Another object is the provision of a structure, the design characteristics of which assure the rapid and uniform dispersal and ignition of liquid fuels.

A further object is the provision of a structure, the design characteristics of which permit it to moderate the rate of pressure rise of high-rise rate liquid fuels.

The inventive inflator relies on the release of a stored liquid fuel and its mixture and reaction with an oxidant to produce a heated combustion gas. The objects of the invention are achieved by storing the liquid fuel in a porous structure, such as a porous ceramic. Control of the rate of release of the liquid fuel from the porous structure results either from selection of the pore size and the sizing of the fuel storage discharge orifice or through controlled disintegration and scattering of the porous structure as part of the process of dispersing the fuel.

DETAILED DESCRIPTION OF THE INVENTION

The inflators described in application Ser. No. 08/252,036, typically involve first and second chambers and an initiator means for initiating the burning of the fluid fuel with an oxidant in the first chamber. The burning fluid fuel produces combustion products which cause a rupture disc, or other openable seal, to burst permitting the combustion products in the first chamber to flow into the second chamber containing a pressurized inert gas stored therein. The inert gas mixes with the combustion products, thereby being heated and increasing in pressure and/or volume, causing a further rupture disc, or other seal, located between the second chamber and a diffuser, to open. The generated gases flow through the diffuser to exit ports from which they are directed to the interior of the airbag cushion. In several of the embodiments a separate fluid fuel storage element is provided to store the fuel separate from the oxidant, thereby facilitating the long-term storage of these fuels. In one case the fluid fuel is stored in a fixed wall chamber directly in front of the initiator and separated from the first chamber by a rupture disc designed to burst open when activation of the initiator develops sufficient pressure within the fixed wall chamber to exceed the burst strength of the rupture disc. In another embodiment, the fluid fuel is provided in a flexible walled bladder adjacent to the initiator. Activation of the initiator causes particle laden gases to contact and open the bladder allowing the fuel to mix with the oxidant in the first chamber. In either of the prior art fluid fuel storage chambers the release of the fuel from the chamber is controlled by the size of the opening produced in either the rupture disc or the flexible bladder, both of which openings are difficult to uniformly control. Accordingly, a need exists to provide an inflator which offers the opportunity to tailor the rate of fuel delivery so that inflation characteristics, such as the rate of pressure increase and the maximum internal pressure, can be controlled; thereby permitting the use of different fuels having different ignition characteristics.

The present invention provides for the storage of a liquid fuel in a porous structure. In one embodiment the porosity of the structure is controlled to provide a moderating control over the release of the liquid fuel stored therein, which, in turn, effectively controls the inflator's rate of pressure increase. In a further embodiment, the porous structure is designed to fragment and be propelled into the first storage chamber, which becomes a combustion chamber, thereby providing a rapid and thorough dispersal of the fuel throughout the oxidant and enhancing the uniform ignition of the resulting fuel-oxidant mixture.

Figure 1:
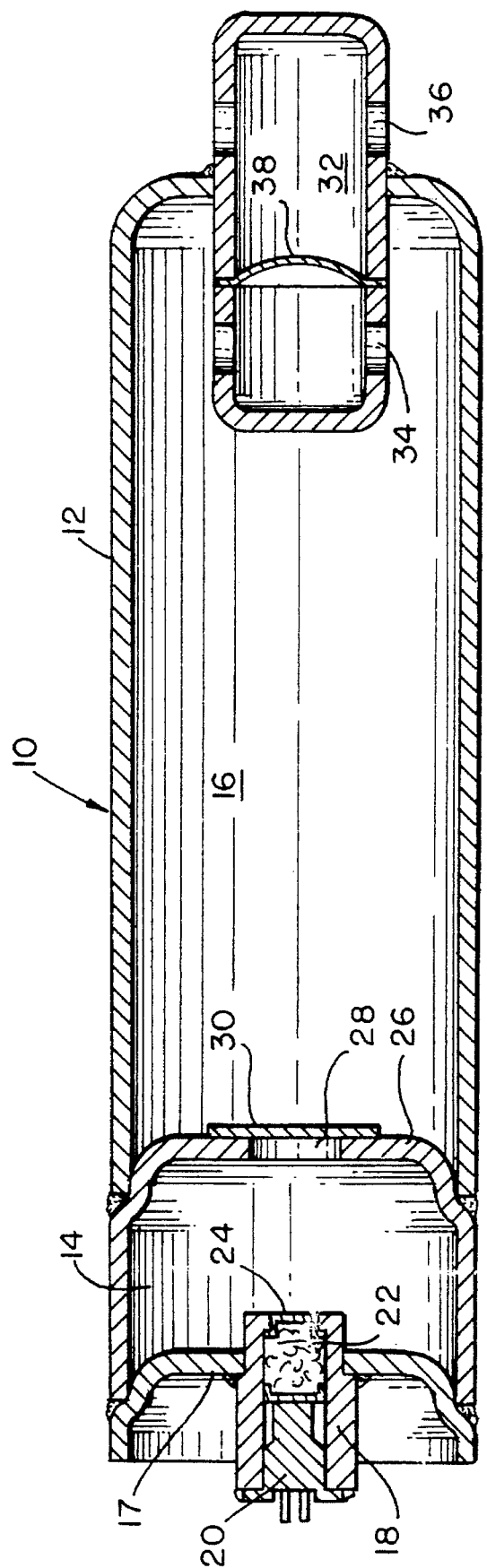
FIG. 1 is a side view illustrating one of the embodiments of the invention.

An inflator in accord with the first embodiment is illustrated in FIG. 1. The inflator assembly 10 comprises a pressure vessel housing 12, which includes a first storage chamber 14, also referred to as a combustion chamber, and a second storage chamber 16, also referred to as an inert gas storage chamber. The pressure vessel housing is typically constructed of metal, such as steel or aluminum. The combustion chamber 14 contains an oxidant, typically an oxygen containing gas mixture. The second storage chamber 16 contains a pressurized gas, typically an inert gas. The combustion chamber includes end plate 17 mounting an ignition housing 18. The ignition housing 18 contains a pyrotechnic initiator, or squib 20, and a porous structure 22 containing the liquid fuel. An openable sealing means, such as a rupture disc 24, is provided between the interior of the cylindrical housing 18 and the combustion chamber 14. The combustion chamber 14 is separated from the inert gas storage chamber 16 by a wall 26 which contains a centrally disposed port 28 normally sealed by a further openable sealing means, such as a rupture disc 30 comprising a thin, rupturable diaphragm. Diffuser 32, located at the opposite end of the inert gas storage chamber 16, contains a first set of ports 34 in fluid communication with the inert gas storage chamber, and a further set of ports 36 in fluid communication with the exterior of the inflator. A final openable sealing means, such as rupture disc 38, is provided between the two sets of ports 34 and 36.

Upon activation, typically by an electrical transmission from a crash sensor (not shown) located on the vehicle body, the initiator 20 creates ignition products which raise the pressure within ignition housing 18, causing the rupture disc 24 to burst. The liquid fuel stored in the porous structure 22 mixes with the ignition products and flows into and mixes with the oxidant in the combustion chamber resulting in combustion of the fuel with the oxidant. The resulting heated combustion gas raises the pressure in the combustion chamber 14 until it exceeds the strength of rupture disc 30, causing it to burst. The heated combustion gas flows into the inert gas storage chamber 16 where it mixes with and heats the inert gas in that chamber, raising the pressure to a point which causes the rupture disc 38 in the diffuser 32 to burst. The product gases then flow through and out of the diffuser 32, via ports 34 and 36, to be directed to the interior of the airbag cushion (not shown).

The porous structure 22 in the fuel chamber controls the flow of liquid fuel into the combustion chamber at rates which are adjusted by varying the relative porosity of the structure. Typically, the porous structure can be fabricated from open celled porous ceramics, such as the reticulated ceramics manufactured by Hi-Tech Ceramics, Inc. and Selee Corp., or porous metal. It could also be fabricated from a honeycomb ceramic such as those manufactured by Ceramem Corp. The porous ceramic can have porosities in the range of between 10 and 100 pores per inch (ppi), preferably between 10 and 30 ppi. The porous structure does not need to have a uniform pore size throughout, but can include zones of different porosities or porosity gradients. While honeycomb ceramics can be randomly arranged, it is preferred that the honeycomb chambers be aligned with the direction of gas flow.

The porous structure can be provided as a structure shaped to fit within a housing, such as the cylindrical ignition housing 18, forming a subassembly of the inflator. In a further embodiment, the structure can be assembled into a liquid fuel cartridge or bladder which is filled with liquid fuel prior to being assembled into the inflator. Once the porous structure has discharged the liquid fuel stored therein, it does not need to survive the combustion process, after the fuel is discharged it may disintegrate, combust or melt. However, if it breaks up into fragments and/or particulates, it may be necessary to provide a screen, or some other form of protection, to assure that the fragments and/or particulates do not block the outlet ports.

The porous structure can be essentially free of voids larger than its intrinsic pores. Alternatively, it can contain pockets, passages or other similar larger voids which can be sized to contain sufficient liquid fuel to provide an initial rapid rate of gas delivery from the inflator by an initial rapid burn of the fuel provided in the larger voids, followed by a slower rate of gas delivery from burning of the remaining fuel as it migrates out of the structure's pores. When a fuel-oxidant mixture which is relatively difficult to ignite is used, a passage can be provided through the structure to provide a conduit to the combustion chamber 14 for particulates produced in the initiator ignition combustion products. Such heated particulates, if present in the combustion chamber, effectively augment the initiation of combustion of the fuel with the oxidant.

The liquid fuels which can be used in the inflators of this invention include such liquefied gases as are liquid at the intended storage conditions. Typical fuels include hydrocarbons such as liquefied propane, butane, octane and mixtures such as gasoline and kerosene; hydrocarbon derivatives including esters, ethers and alcohols, such as methanol, ethanol and propanol. Additionally, materials which are recognized as liquid propellants containing both fuel and oxidant, such as hydroxylamine nitrate/triethanolamine nitrate/water (HAN/TEAN/$H_2O$), hydrazine, hydrogen peroxide, nitromethane and ethylene oxide are useful herein. The liquid fuels may be mixed with other compounds which are not generally considered to be fuels, provided the mixtures retain their intended function. For instance, while water is not a fuel, combustible denatured alcohol is a useful fuel which can be provided as a mixture of ethanol, methanol and water.

The oxidant provided in the combustion chamber can be oxygen or an oxygen containing mixture, such as air or oxygen enriched air or it can be nitrous oxide, $N_2O$, or an $N_2O$ containing mixture. The mixture may contain diluents such as nitrogen, carbon dioxide or noble gases, such as helium, argon or xenon. A mixture of 50–65% oxygen with the balance being argon is advantageously used with an ethanol based liquid fuel.

The total amounts of fuel and oxidant can be provided in an equivalence ratio between 0.4 and 1.4, however they are preferably provided at an equivalence ratio between 0.6 and 1.0, and most preferably between 0.6 and 0.8. Complete combustion of the fuel component, as evidenced by minimal levels of incomplete or undesirable combustion products, such as carbon monoxide (CO), oxides of nitrogen ($NO_x$) and unburned hydrocarbons, is preferred.

The pressurized gas provided in the inert gas storage chamber 16 is an inert gas, such as argon or nitrogen, stored at a pressure typically in the range of 2000 to 4000 psi. The pressurized gas usually includes a minor amount of helium provided for its easy detection during leak testing procedures.

Figure 2:
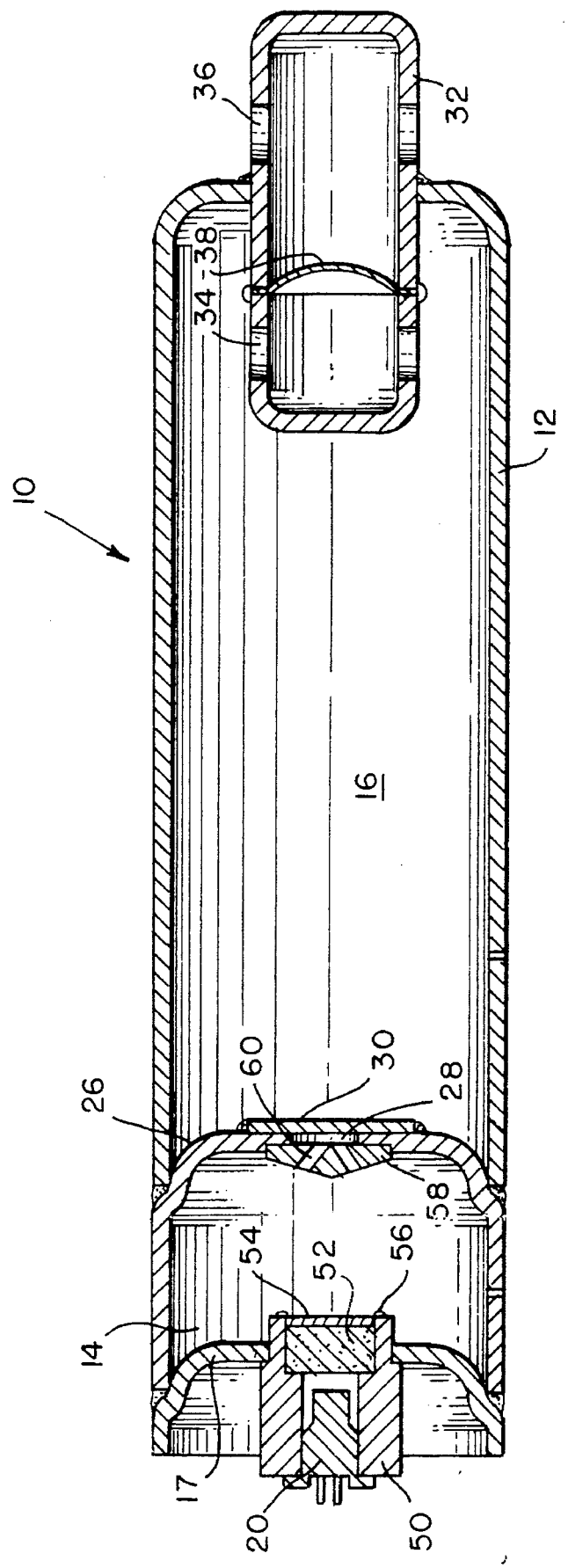
FIG. 2 is a side view illustrating another embodiment of the invention.

In the embodiment illustrated in FIG. 2, similar components are designated by similar item numbers. This embodiment provides for storage of the liquid fuel in a frangible porous disc which, upon activation of the initiator, is fragmented and the fragments scattered into the combustion chamber, thereby effectively dispersing liquid fuel throughout the chamber.

In this embodiment, initiator 20 is mounted at the exterior end of ignition housing 50. A frangible, porous disc 52 fits tightly on a shoulder provided in the ignition housing 50 such that the porous disc is closely adjacent the initiator 20. The frangible, porous disc 52 is manufactured from a material, such as a ceramic, which will thoroughly fragment upon activation of the initiator, and is shaped and sized to have sufficient volume to contain the liquid fuel required by the inflator. In order to avoid leakage of the liquid fuel which allows the fuel to come in contact with the oxidant during the extended storage phase; a thin, non-porous, frangible disc 54 is provided over that face of the frangible disc 52 which faces the combustion chamber 14. The non-porous frangible disc may be a ceramic having a thickness in the range of 2 to 10 mm. If needed, the edge of the non-porous disc can be covered by a bead of sealant 56. The sealant can be a metal, such as aluminum, a non-porous ceramic or a plastic, such as epoxy. Alternatively, the face of the porous disc which faces the combustion chamber can be coated with a non-porous coating which is substantially impermeable to the liquid fuel. Suitable impermeable coatings include silicones, metals, glass and plastics, such as epoxies. A cone shaped throttle 58 overlies the port 28 leading from the combustion chamber 14 to the inert gas storage chamber 16. The cone shaped throttle is located directly across the combustion chamber from the frangible discs 52 and 54, and serves to assure that the discs are sufficiently fragmented that they do not restrict gas flow through the ports. The gas passages 60 through the throttle are located so that the gas is flowing in a radial direction as it enters the passageway in order to discourage the entry of particulates therein. Rupture disc 30 overlies that side of the port 28 which faces the inert gas storage chamber. The remaining components of this assembly essentially correspond to similar components in the FIG. 1 embodiment.

Activation of the inflator by an electrical signal from a sensor (not shown) located on the vehicle body, causes the pyrotechnic charge of the igniter 20 to ignite, which, in turn, causes displacement and fragmentation of the porous fuel storage disc 52. The liquid fuel in the disc vaporizes as the particles from the fuel storage disc are exposed and dispersed in the combustion chamber 14. The fuel is ignited by the heat and radiant particles produced by the pyrotechnic igniter. The pressure in chamber 14 quickly develops to a point where it exceeds both the pressure in the inert gas storage chamber and the strength of rupture disc 30, resulting in disc 30 opening. The high temperature and high pressure combustion products in the combustion chamber 14 then flow through the gas passages 60, and port 28, into the inert gas storage chamber 16 where they mix with the pressurized inert gas producing a rapid increase in pressure causing rupture disc 38 to open. The expanded gases then flow from the inert gas storage chamber through the diffuser 32 and eventually are directed into the airbag cushion (not shown). If needed, one or more constrictive orifices can be located between the inert gas storage chamber 16 and the diffuser outlet ports 36 to moderate the flow of gas, thereby providing further control over the fill rate of the airbag cushion.

The fragmentation of the fuel disc provides an effective means for vaporizing and dispersing the fuel charge. Such mixing and vaporization results in a more efficient combustion reaction diminishing the presence of undesirable products of incomplete combustion, such as carbon monoxide and incompletely combusted hydrocarbons, in the product gas.

It should be understood that the preceding description is intended to be sufficiently complete to provide a clear understanding of the invention. No unnecessary limitations should be assumed from the description since modifications within the scope of the invention will be obvious to those of ordinary skill in the art. Accordingly, the scope of the invention should be determined based on the scope of the following claims.

We claim:

1. In an inflator comprising:

(a) an initiator;

(b) a fuel chamber containing a liquid fuel;

(c) a housing containing a combustion chamber;

(d) an oxidant in said combustion chamber; and (e) at least one discharge port;

arranged so that activation of said initiator initiates the burning of said liquid fuel and oxidant in said combustion chamber producing gases which exit the inflator through said discharge port;

the improvement comprising:

said liquid fuel stored in a porous solid structure within said fuel chamber.

2. The inflator of claim 1 wherein said porous solid structure is fabricated from a porous material which is also frangible.

3. The inflator of claim 2 wherein said frangible porous solid structure is positioned between said initiator and said combustion chamber;

whereby the combustion products produced by the firing of said initiator are directed at said frangible porous structure causing it to disintegrate and release its fuel into said combustion chamber.

4. The inflator of claim 3, wherein a non-porous structure is located between said frangible porous solid structure and said combustion chamber.

5. The inflator of claim 4, wherein said non-porous structure comprises a non-porous coating on at least a portion of the surface of said frangible porous solid structure facing said combustion chamber.

6. The inflator of claim 4 wherein said frangible porous solid structure fits tightly in a shoulder provided in said housing adjacent said combustion chamber.

7. The inflator of claim 6 wherein said frangible porous solid structure is disc shaped.

8. The inflator of claim 7 wherein said non-porous structure is disc shaped.

9. The inflator of claim 2 wherein said frangible porous solid structure is fabricated from a porous metal.

10. The inflator of claim 2 which also comprises an inert gas storage chamber separated from said combustion chamber by an openable closure structure.

11. The inflator of claim 10 wherein said openable closure structure comprises a rupturable thin metal diaphragm.

12. The inflator of claim 10 further comprising a cone shaped throttle member having radially directed gas passages extending toward said inert gas storage chamber from said combustion chamber.

13. The inflator of claim 12 wherein said openable closure structure further comprises a thin rupturable diaphragm.

14. The inflator of claim 2 wherein said frangible porous solid structure is fabricated from a ceramic material.

15. The inflator of claim 2 wherein said liquid fuel is selected from the group consisting of hydrocarbons, hydrocarbon derivatives and mixtures thereof.

16. The inflator of claim 15 wherein said liquid fuel comprises paraffinic hydrocarbons.

17. The inflator of claim 15 wherein said liquid fuel is selected from the group consisting of methanol, ethanol, propanol, butanol and mixtures thereof.

18. The inflator of claim 1 wherein said housing also comprises:

(f) said fuel chamber adjacent said initiator;

(g) an openable seal provided between said fuel chamber and said combustion chamber.

19. The inflator of claim 18, wherein
said openable seal comprises a thin diaphragm hermetically sealing a port located between said fuel chamber and said combustion chamber, the strength of said thin diaphragm being insufficient to withstand the pressure developed in said fuel chamber when said initiator is activated.

20. The inflator of claim 18, wherein said liquid fuel is selected from the group consisting of methanol, ethanol, butane, and mixtures thereof.

21. The inflator of claim 18, wherein said porous solid structure is ceramic.

22. The inflator of claim 21, wherein said porous ceramic contains between 10 and 100 pores per inch.

23. In an inflator comprising:

(a) an initiator;

(b) a liquid propellant;

(c) a housing containing a combustion chamber; and (d) at least one discharge port;

arranged so that activation of said initiator initiates the burning of said liquid propellant in said combustion chamber producing gases which exit the inflator through said discharge port;

the improvement comprising providing:

(e) a propellant chamber adjacent said initiator;

(f) a porous solid structure within said propellant chamber;

(g) an openable seal located between said propellant chamber and said combustion chamber; and said liquid propellant stored in said porous structure.

24. The inflator of claim 23 wherein said openable seal comprises a thin diaphragm hermetically sealing a port between said propellant chamber and said combustion chamber, the strength of said thin diaphragm being insufficient to withstand the pressure developed in said propellant chamber when said initiator is activated.

25. The inflator of claim 23 wherein said porous solid is a porous ceramic.

26. The inflator of claim 25 wherein said porous ceramic contains between 10 and 100 pores per inch.

27. The inflator of claim 23 wherein said liquid propellant is a mixture comprising hydroxylamine nitrate and triethanolamine nitrate.

28. The inflator of claim 23 wherein said porous solid is a porous metal.

* * * * *